No. 895,847. PATENTED AUG. 11, 1908.
R. DITCHFIELD.
LAWN RAKE.
APPLICATION FILED FEB. 19, 1908.
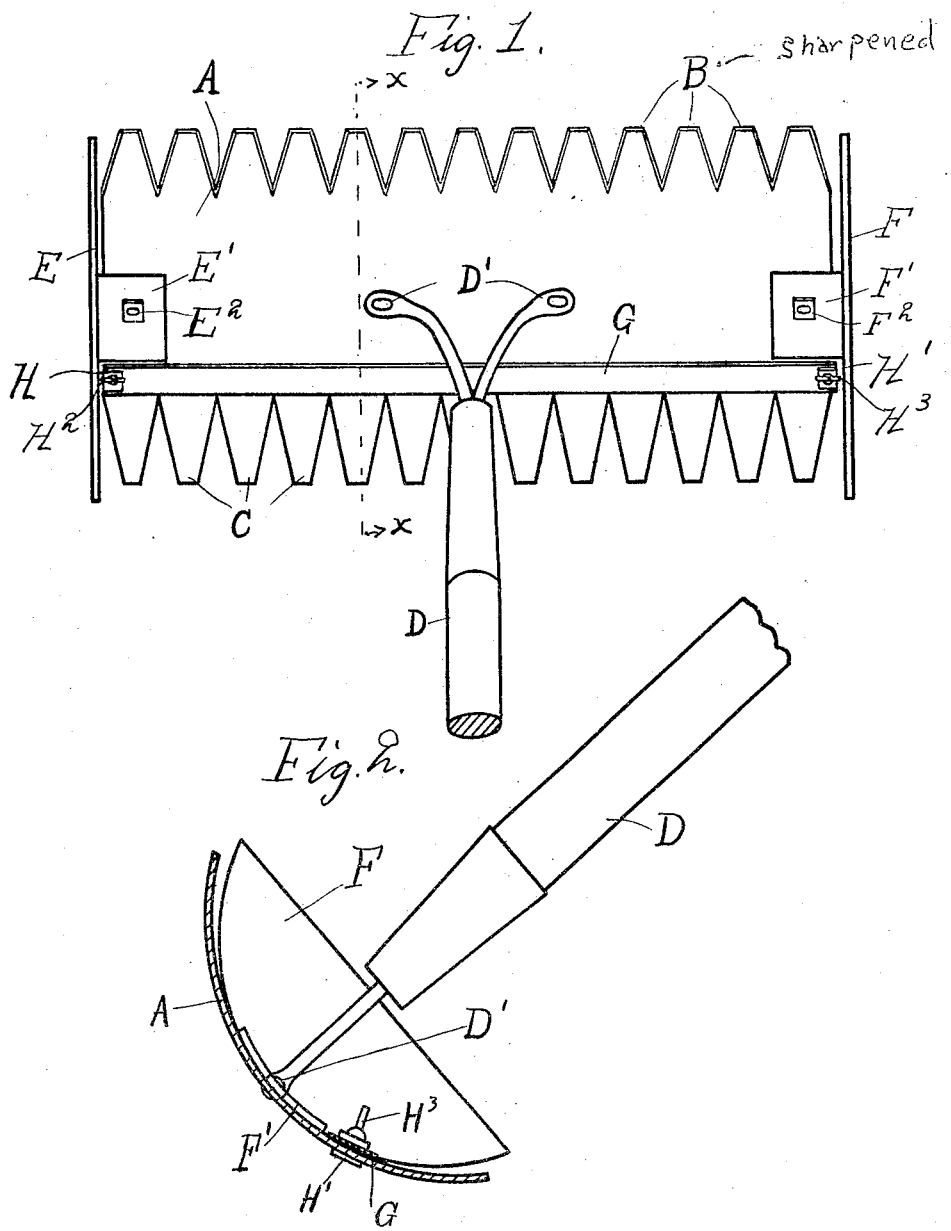
WITNESSES
S. M. Gallagher
E. N. Schofield
INVENTOR
Robert Ditchfield
BY
ATTORNEY

UNITED STATES PATENT OFFICE.

ROBERT DITCHFIELD, OF WOODSTOCK, ONTARIO, CANADA.

LAWN-RAKE.

No. 895,847.  Specification of Letters Patent.  Patented Aug. 11, 1908.

Application filed February 19, 1908. Serial No. 416,674.

*To all whom it may concern:*

Be it known that I, ROBERT DITCHFIELD, a citizen of the Dominion of Canada, residing at Woodstock, Province of Ontario, Canada, have invented a certain new and useful Improvement in Lawn-Rakes, of which the following is a specification.

My invention relates to a new and useful improvement in lawn rakes, and has for its object to provide an exceedingly simple and effective device of this description by means of which leaves, rubbish and the like may be removed from the lawn without injuring the same in any way. It will also remove dandelions from the lawn and may be used to level loose earth and keep gravel walks in condition.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by letter to the accompanying drawing forming a part of this specification, in which—

Figure 1 is a plan view of my improved rake. Fig. 2, an enlarged section thereof at the line $x$—$x$ of Fig. 1 looking in the direction of the arrow.

In carrying out my invention as here embodied, A represents the body of the rake, which is made from an oblong plate of sheet steel curved transversely, as can be readily seen in Fig. 2, one side of which is so cut as to form the teeth B, and the opposite side is cut in the same manner to form the teeth C, the only difference being that these teeth are longer than those on the opposite side. To this plate is fastened the handle D, at the points D'. The end wings E and F which are semi-circular in shape have formed therewith the extensions E' and F', bent at right angles thereto, which are held in place upon the ends of the rake by means of the bolts $E^2$ and $F^2$.

In order that the teeth C may be made shorter, or the sharp corners formed at that point where the teeth join together may be obliterated, I provide the longitudinal bar G which is held in place in proximity to the teeth C by the curved members H and H', which have thumb screws $H^2$ and $H^3$ which pass through an opening in one side thereof and press against the longitudinal bar, thus drawing it tight upon the body of the rake.

In practice, the short teeth of the rake are usually used where a lawn is not very dirty to keep it in condition. When the rake comes in contact with dandelions it will readily cut them from their stems removing them from the lawn. In the autumn when a great number of leaves have fallen upon the lawn the longer teeth are used, and these will readily gather up the leaves or other rubbish, and the end wings will prevent them from being blown from the rake, and the longitudinal bar will prevent the grass from being pulled from its roots, which is often the case with ordinary lawn rakes. This rake never becomes clogged.

Of course I do not wish to limit myself to the exact details here shown as the side wings may be omitted without interfering with the utility of the rake.

Having thus fully described my invention, what I claim as new and useful, is—

1. In a lawn rake, an oblong plate of sheet steel curved transversely, teeth cut from one side thereof, a second set of longer teeth cut from the opposite side thereof, end wings having extensions formed therewith bent at right angles thereto, bolts passing through said extensions and through said oblong plate for holding said end wings to the ends of said oblong plate, a longitudinal bar adapted to move up and down on the inside surface of the oblong plate in proximity to the set of longer teeth used for shortening said longer teeth or obliterating the sharp corners formed by said teeth, curved members situated at either end of the longitudinal bar, having thumb screws passing through openings therein for adjustably securing the longitudinal bar to the oblong plate in proximity to the longer teeth and a handle attached to the rake, as shown and described.

2. In combination, an oblong plate of sheet steel curved transversely, teeth cut from one side thereof, a second set of longer teeth cut from the opposite side thereof, a longitudinal bar adapted to move up and down on the inside face of the oblong plate in proximity to the longer teeth for shortening said longer teeth or obliterating the sharp corners formed thereby, curved members having openings formed therein situated at either end of the longitudinal bar, thumb screws passing through said openings and pressing against the longitudinal bar for adjustably securing it to the oblong plate in proximity to the longer teeth and a handle also secured to the oblong plate in a central position on the inner face of the oblong plate, as shown and described.

3. In combination, an oblong plate of sheet steel curved transversely, teeth formed from one side thereof, end wings semi-circular in shape having extensions formed therewith adapted to be secured to the ends of the oblong plate, means for securing them to the ends of the oblong plate, a longitudinal bar adapted to be moved upon the inner face of the oblong plate for shortening the longer teeth and obliterating the sharp corners formed thereby, means for adjustably securing the ends of said longitudinal bar to the oblong plate and a handle also secured to the plate, substantially as, and for the purpose set forth.

4. The herein described combination of an oblong plate of sheet steel curved transversely, teeth cut from two sides thereof, one set being longer than the other, end wings semi-circular in shape, extensions formed therewith for detachably securing the same to the inner surface of the plate in proximity to the longer teeth, as shown and described.

In testimony whereof, I have hereunto affixed my signature in the presence of two subscribing witnesses.

ROBERT DITCHFIELD.

Witnesses:
WM. DUNDASS,
THOS. WELLS.